United States Patent [19]

Kinose et al.

[11] Patent Number: 5,260,541
[45] Date of Patent: Nov. 9, 1993

[54] CROP SHEAR APPARATUS AND CROP SHEAR EQUIPMENT

[75] Inventors: Ryohei Kinose, Hitachi; Toshiyuki Kajiwara, Tokyo; Yasutsugu Yoshimura, Hitachi, all of Japan

[73] Assignee: Hitachi, Ltd., Japan

[21] Appl. No.: 804,064

[22] Filed: Dec. 9, 1991

[30] Foreign Application Priority Data

Dec. 10, 1990 [JP] Japan ............... 2-401025

[51] Int. Cl.$^5$ ............... B23K 11/02; B21B 1/22
[52] U.S. Cl. ............... 219/105; 72/203; 219/93; 219/102
[58] Field of Search ............... 72/203; 83/345, 670, 83/673, 674; 219/91.2, 93, 102, 105; 28/170, 171, 172, 173.6, 173.7

[56] References Cited

U.S. PATENT DOCUMENTS

| | | | |
|---|---|---|---|
| 2,036,798 | 12/1936 | Firth | 72/203 |
| 3,322,012 | 5/1967 | Murray | 83/673 |
| 4,497,192 | 2/1985 | Reizig et al. | 72/203 |

FOREIGN PATENT DOCUMENTS

| | | | |
|---|---|---|---|
| 988411 | 5/1976 | Canada | 83/345 |
| 0201744 | 4/1987 | European Pat. Off. | |
| 142006 | 6/1980 | German Democratic Rep. | 219/105 |
| 55-36039 | 3/1980 | Japan | 72/203 |
| 55-120403 | 9/1980 | Japan | |
| 57-115902 | 7/1982 | Japan | 72/203 |
| 58-74202 | 5/1983 | Japan | |
| 60-21001 | 5/1985 | Japan | 72/203 |
| 60-201816 | 10/1985 | Japan | |
| 60-231504 | 11/1985 | Japan | |
| 1-310807 | 12/1989 | Japan | |

OTHER PUBLICATIONS

Article: "Advanced Technology of Hot Strip Mill in Japan" pp. 31, 32 Dec. 1987.

*Primary Examiner*—Geoffrey S. Evans
*Attorney, Agent, or Firm*—Evenson, McKeown, Edwards & Lenahan

[57] ABSTRACT

In a crop shear apparatus disposed in a conveyance passage in which band steel is conveyed from a first rolling mill to a second rolling mill of hot rolling equipment, the crop shear apparatus including: at least one shear blade for shearing the band steel in a widthwise direction conveyed from the first rolling mill to the second rolling mill; and a supporting mechanism for movably supporting the at least one shear blades in the widthwise direction of the band steel, wherein the at least one shear blade is present in a non-linear manner along the widthwise direction of the band steel such that a projection quantity of the band steel in the conveyance direction at a sheared end portion can be adjusted when the band steel is sheared in a state where the blade has been moved in the widthwise direction of the band steel and the shear blade is formed into a non-mirror-symmetrical shape on two side portions of a portion which corresponds to the center in the widthwise direction of the band steel, a projection quantity in at least one of the sheared front and rear end portions of the band steel can be adjusted independently of a width of the band steel.

13 Claims, 11 Drawing Sheets

CROP SHEAR APPARATUS AND CROP SHEAR EQUIPMENT

BACKGROUND OF THE INVENTION

1. FIELD OF THE INVENTION

The present invention relates to a crop shear apparatus, and, more particularly to a crop shear apparatus for, in a widthwise direction of a band steel plate, shearing a crop formed in a lengthwise directional end portion, that is, in a conveyance directional end portion of the band steel plate rolled by a roughing-down or rough rolling mill of hot rolling equipment before it is rolled by a finish rolling mill.

2. DESCRIPTION OF THE RELATED ART

- In order to meet a desire of preventing an undesirable or uneven contraction or reduction (a problem taken place in that the degree, at which a material is rolled, becomes nonuniform in the widthwise direction of the material due to the positional deviation of the material in the axial direction of the rolling mill) which will be taken place at the finish rolling operation performed in hot rolling equipment, there has been available a crop shear apparatus for shearing, as a crop, an irregular end portion such as a fish tail or a tongue formed in at least either of a leading end portion or a rear end portion of a band steel, which has been rolled by a rough rolling mill, in the widthwise direction of the band steel before the band steel is rolled by a finish rolling mill (for example, "Advanced Technology of Hot Strip Mill in Japan", p.p 31 to 32, Japanese Patent Unexamined Publication No. 1-310809 and Japanese Patent Unexamined Publication No. 60-201816). Another technology or use in an endless rolling operation has been known in which two band steel plates, the lengthwise end portions of which are positioned adjacent to each other, are connected to each other at the adjacent end portions before the band steel is subjected to the finish rolling (for example, Japanese Patent Unexamined Publication No. 60-231504).

At p.p 31 to 32 of "Advanced Technology of Hot Strip Mill in Japan", the following facts are disclosed:

(1) A crop shear is disposed in an inlet side of a finish rolling mill so as to cut a crop formed in the front and rear end portions of a bar rolled in the rough rolling process in order to remove defective portions, prevent undesirable contractions and as well as to prevent a surface of the roll from being recessed due to catch of material at a low temperature.

(2) The crop shears are exemplified by a drum-type shear, a crank-type shear and a vibration-type shear.

(3) The drum-type shears are exemplified by a single knife type shear having one shear blade mounted to one drum and a double knife type shear having two shear blades mounted to the same.

(4) Either of the blades of the double knife type shear is used to shear the front end portion (leading end portion) of the bar or band steel, while the other blade is used to shear the rear end portion (trailing end portion) of the band steel.

(5) An example of the double knife type crop shear is illustrated and disclosed in which a straight blade is used to serve as one of the two blades and a curved (circular-arc) blade, the radius of curvature of which is 13.843 m, is used to serve as the other shear blade.

However, if the widths of the band steel plates to be sheared are different from each other in a case where a circular-arc shear blade having constant radius of curvature is used, the degree of projection of a widthwise end portion of the band steel in the lengthwise direction of the band steel with respect to the widthwise directional central portion of the band steel, that is, a "projection quantity" becomes different (for example, in a case where the radius of curvature is 13.84 m, the projection quantity is 3.3 mm if the width of the band steel is 60 cm, while the projection quantity is 23.1 mm if the width of the band steel is 160 cm). However, the change in the planar shape of the end portion generated due to the finish rolling does not necessarily hold a positive correlation with the width of the band steel but it depends upon the cross sectional shape of the band steel to be finish-rolled.

However, at p.p 31 to 32 of "Advanced Technology of Hot Strip Mill in Japan", there is no description about the technology of adjusting the projection quantity of the shear front end portion of the band steel or the shear rear end portion of the same independent of the width of the band steel.

In Japanese Patent Application Laid-Open No. 1-310809, a technology has been disclosed in which the shear blade is formed into a curved shape when viewed in a direction perpendicular to the principal surface of the band steel such that the quantity of lapping of the upper shear blade of a drum-type crop shear and the lower shear blade of the same is made to be zero in the side end portions the widthwise directional end portions) of the band steel.

However, there is no description about the technology of adjusting the projection quantity of the shear front end portion of the band steel or the shear rear end portion of the same independent of the width of the band steel in Japanese Patent Application Laid-Open No. 1-310809.

In Japanese Patent Application Laid-Open No. 60-201816, a crop shear is disclosed which is capable of movably supporting the shear blade in the widthwise direction (in the axial direction of the drum) of the band steel in order to change portions of the shear blade which shear the side end portions of the band steel because the above-described portions of the shear blade for shearing the side end portions is likely to be broken if the same portion of the shear blade of the crop shear apparatus of the drum-type shear repeatedly shears a crop of the band steel having a constant width along the widthwise direction of the band steel.

However, in Japanese Patent Application Laid-Open No. 60-201816, a fact has been disclosed that shearing by using the same portion of the blade must be inhibited but there is no description about the necessity of determining the shape of the shear blade in accordance with the widthwise directional movement of the blade.

In Japanese Patent Application Laid-Open No. 60-231504, the following conventional technologies are described:

(1) The front and rear end portions of the two band steel plates are connected to each other by multi-layer build up welding.

(2) The fillets formed by stacking the front and rear end portions of the two band steel plates are spot-welded to connect the adjacent front and the rear end portions of the two band steel plates.

(3) The adjacent front and rear end portions of the two band steel plates are machined before they are stacked up and the machined two adjacent end portions of the two band steel plates are connected by a bolt.

Furthermore, problems experienced with the above-described conventional technology are described in which the above-described connection took a relatively long time and and/or would increase the cost. In addition, a technology has been disclosed in which the two adjacent front and rear end portions of the two band steel plates, which have been sheared into shapes complementary to one another, are introduced into the finish rolling mill while maintaining the above-described two adjacent front and rear end portions at a state in which they are forcibly positioned in contact with each other so that the contact portions are metallurgically connected to each other at the time of the finish rolling process.

However, in the above-described case of the technology disclosed in Japanese Patent Unexamined Publication No. 60-231504 in which the complementarily shaped ends are forcibly positioned in contact with each other, the two adjacent front and rear end portions of the two band steel plates are not secured to each other before the finish rolling operation is performed. Therefore, the ends of the two band steel plates are not ensured to be kept in contact, and therefore are not ensured to be connected at the time of the finish rolling process.

SUMMARY OF THE INVENTION

An object of the present invention is to provide a crop shear apparatus capable of individually independently adjusting the projection quantity of at least either of a front sheared end portion of the band steel and a rear sheared end portion of the same from a width of the band steel to be sheared.

Another object of the present invention is to provide crop shear equipment capable of shearing/connecting the front and rear end portions of band steel such that the two band steel plates are ensured to be connected to each other by finish rolling.

According to the present invention, the above-described first object can be achieved by a crop shear apparatus comprising: a supporting mechanism for movably supporting at least one shear blade in a widthwise direction of the band steel, wherein the at least one shear blade is present in a non-linear manner along the widthwise direction of the band steel such that a plane shape along the widthwise direction of the band steel or projection quantity of the band steel in the conveyance direction at a sheared end portion can be adjusted when the band steel is sheared in a state where the blade has been moved in the widthwise direction of the band steel and the shear blade is formed into a non-mirror-symmetrical shape on a center in the widthwise direction of the band steel.

In the specification of the present invention, the "projection quantity at the end portion (in the lengthwise direction of the band steel) in the direction in which the band steel is conveyed" means the maximum quantity of projection, at the lengthwise end portion, of the widthwise end portions of the band steel in the lengthwise direction of the band steel with respect to the central portion in the widthwise direction of the band steel.

In the crop shear apparatus according to the present invention, because each of the shear blades is non-linearly extended in the widthwise direction of the band steel, because the shear blades are formed into not mirror-symmetrical shapes on the two side portions of the widthwise directional center of the band steel, and because the shear blades are movably supported in the widthwise direction of the band steel by the supporting mechanism, by shearing the band steel after moving the blade in the widthwise direction of the band steel by a proper quantity, the projection quantity of the band steel in the conveyance direction in at least either of the front end portion (the leading end portion) and the rear end portion (the trailing end portion) can be individually or independently adjusted from or of the width of the band steel to be sheared. The above-described shear blade is composed of at least two portions having individual radii of curvature.

According to one preferred embodiment of the present invention, the at least one non-linear shape shear blade has a straight blade portion extending in a direction perpendicular to a lengthwise direction of the band steel and a diagonal or oblique blade portion diagonally or obliquely extending from the straight blade portion. In this case, either of the side end portions (widthwise end portions) of the band steel is sheared by the straight blade portion, while the other side end portion (widthwise directional end portion) of the band steel is sheared by a specific portion of the diagonal blade portion in accordance with the projection quantity to be realized. As a result, the projection quantity can be made to be constant regardless of the width of the band steel. In this case, a structure may be employed in which the at least one non-linear shape shear blade has the straight blade portion at an intermediate portion in the widthwise direction and the diagonal or oblique blade portions on the two end portions in the widthwise direction. Another structure may be employed in which the at least one non-linear shape shear blade has the diagonal or oblique blade portion at an intermediate portion in the widthwise direction and the straight blade portions on the two end portions in the widthwise direction.

According to one preferred embodiment of the present invention, the above-described second object can be achieved by crop shear equipment comprising the crop shear apparatus and a connecting device disposed between the crop shear apparatus and a second rolling mill and acting to connect a rear end portion of a leading band steel with a front end portion of a follower band steel positioned in an upstream side of the leading band steel. In the crop shear equipment, the two band steel plates can be connected to each other in a state where the projection quantities of at least either of the rear end portion of the leading band steel and the front end portion of the follower band steel positioned in the upstream of the leading band steel to be connected by the connecting device are adjusted to be suitable magnitude(s) for the finish rolling operation.

The crop shear equipment according the present invention may be preferably arranged in such a manner that the at least one non-linear shape shear blade has an intermediate straight blade portion and non-linear blade portions disposed on the two sides of the intermediate straight blade portion and having different shapes, the intermediate straight blade portion and either of the non-linear blade portions shear a rear end crop of the leading band steel, the intermediate straight blade portion and the other non-linear blade portion shear a front end crop of the follower band steel, and the at least one non-linear shear blade in adapted to shear the rear end portion of the leading band steel and the front end portion of the follower band steel such that the sheared front end portion and the sheared rear end portion are ensured to be connected to each other in substantially overall region in the widthwise direction after a portion in which the leading band steel and the follower band steel are partially connected have been rolled by the other rolling mill. In the crop shear equipment, substantially one shear blade shears/separates the rear end crop of the leading band steel positioned in the downstream side and the front end crop of the follower band steel positioned in the upstream side into the desired shapes. Then, the sheared rear end portion of the leading band steel and the sheared front end portion of the follower band steel are connected to each other by the connecting device. Therefore, when it is rolled by the above-described second rolling mill, the sheared front end portion and the sheared rear end portion are partially connected to each other overall the widthwise directional portion.

The crop shear equipment may be preferably arranged in such a manner that the crop shear apparatus has at least two shear blades; the supporting device is adapted to movably support the at least two shear blades in the widthwise direction of the band steel, either one of the two shear blades shears the rear end crop of the leading band steel and the other shear blade of the two shear blades shears the front end crop of the follower band steel, and the at least two shear blades are adapted to shear the rear end portion of the leading band steel and the front end portion of the follower band steel such that the sheared front end portion and the sheared rear end portion are connected to each other in substantially overall region in the widthwise direction after a portion in which the leading band steel and the follower band steel are connected have been rolled by the second rolling mill. Also in the above-described crop shear equipment, the two shear blades capable of moving in the above-described widthwise direction of the band steel shear/separate the rear end crop of the leading band steel positioned in the downstream side and the front end crop of the follower band steel positioned in the upstream side into desired shapes. Then, the sheared rear end portion of the leading band steel and the sheared front end portion of the follower band steel are connected to each other by the connecting device. Therefore, when it is rolled by the above-described second rolling mill, the sheared front end portion and the sheared rear end portion are connected to each other overall the widthwise directional portion.

In this case, according to one preferred embodiment of the present invention, the supporting mechanism is structured such that it integrally moves the two shear blades in the widthwise direction. The two shear blades may be fastened at positions away from each other in the circumferential direction of a rotational drum supported by the supporting device such that they are capable of moving together in the axial direction of the drum so that a drum-type shear is constituted. According to another preferred embodiment of the present invention, the supporting mechanism is structured such that it individually moves the two shear blades in the widthwise direction. The two shear blades may be mounted at positions of individual rotational drums supported by the supporting device such that they ar capable of moving independently in the axial direction so that individual drum-type shears are constituted. The two shear blades may comprise pendulum shears and each of the pendulum shears may be supported by the supporting device such that they can be displaced or moved in the widthwise direction of the band steel.

The shear blade(s) preferably shears the rear end portion of the leading band steel and the front end portion of the follower band steel in such a manner that the rear end portion of the leading band steel and the front end portion of the follower band steel are connected in its widthwise end portions at the time of the connection. In this case, the overlap taken place in the vertically disposed shear blades of the drum-type shear can be minimized at the two ends in the widthwise direction of the band steel, preferably it can be eliminated. It is preferable that the connecting device be structured such that the rear end portion of the leading band steel and the front end portion of the follower band steel are connected to each other by electric resistance-heating. In this case, at least either of the rear end portion of the leading band steel and the front end portion of the follow band steel can be resistance-heated at two widthwise end portions by a high electric current density of currents because electric currents are collectively passed through its two widthwise end portions. Therefore, a connection over a minimum strength to ensure to avoid the fear of the separation at the time of the finish rolling operation can be reliably established within a short time. Therefore, the undesirable temperature drop of the band steel can be minimized and thereby the quality of the rolled product can be improved. Furthermore, the level of the electric current required to be passed through the leading and the following band steel plates at the time of performing the resistance-heating operation can be minimized.

Meanwhile, in a crop shear apparatus according a preferred embodiment of the present invention, the at least one shear blade has a shape with which the rear end portion of the band steel extends in substantially linearly in a direction substantially perpendicular to the conveyance direction after the band steel has been rolled by the second rolling mill. As a result, the band steel can be effectively utilized from the front end portion to the rear end portion regardless of the arrangement made whether or not the connecting device is disposed in the downstream side of the crop shear apparatus.

The foregoing and other objects, features as well as advantages of the invention will be made clearer hereafter from the description of preferred embodiments of the invention with reference to attached drawings.

DESCRIPTION OF THE PREFERRED EMBODIMENTS

Figure 1:
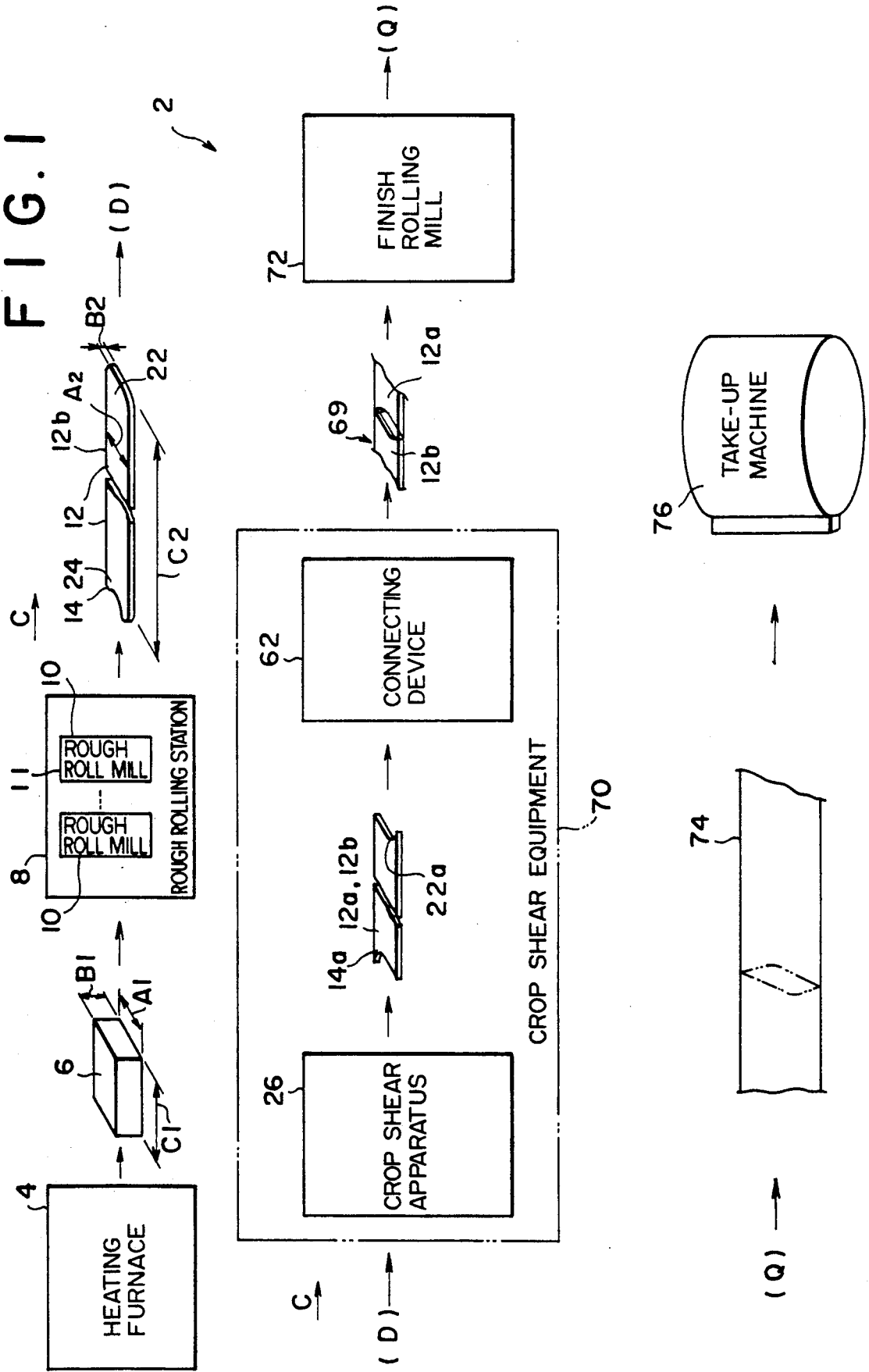
FIG. 1 is a schematic flow chart which illustrates an endless rolling process performed in continuous rolling equipment to which a crop shear apparatus and equipment according to the present invention are applied.
Figure 2:
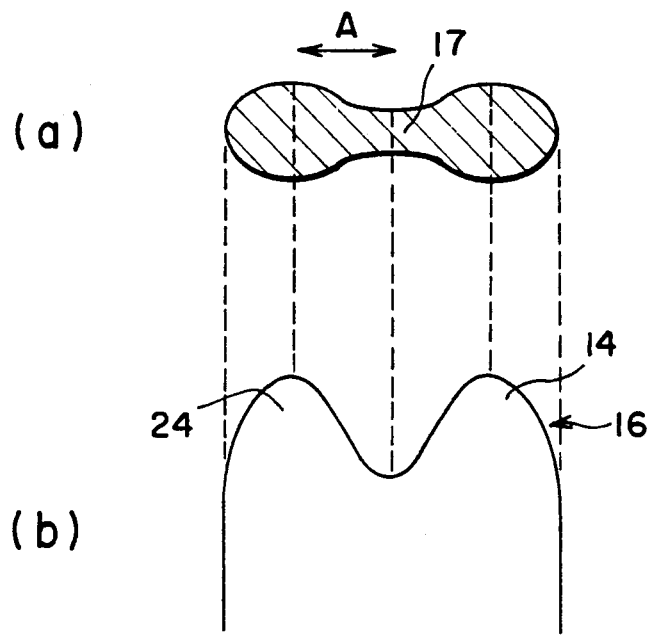
FIG. 2 illustrates relationship between a cross sectional shape of band steel and the shape of a crop generated by rolling of the band steel, where upper part (a) illustrates the cross sectional shape having a thin intermediate portion in the widthwise direction and lower part (b) illustrates a fish tail like crop.
Figure 3:
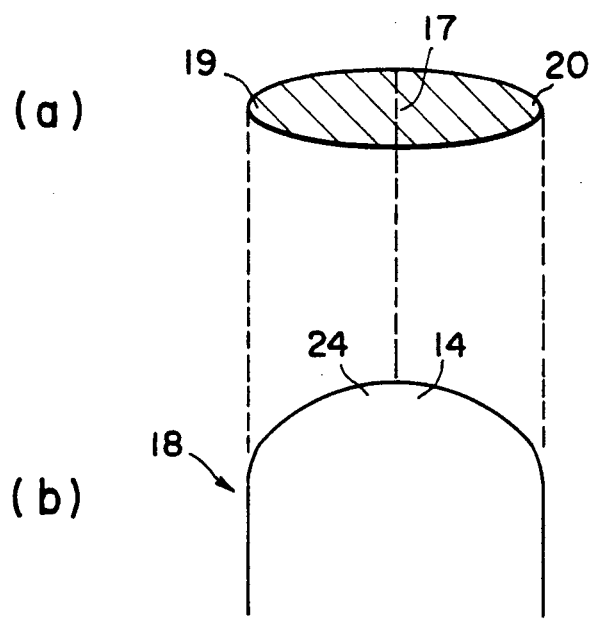
FIG. 3 illustrates relationship between a cross sectional shape of band steel and the shape of a crop generated by rolling of the band steel, where upper part (a) illustrates a cross sectional shape having a thick intermediate portion in the widthwise direction and lower part (b) illustrates a tongue like crop.

FIG. 1 illustrates a schematic structure of an endless hot rolling equipment 2. In the hot rolling equipment 2, a block-like thick plate 6 heated in a heating furnace 4 and fed out from the same is roughly rolled by a plurality of rough rolling mills 10 of a rough rolling station 8 which serves as a first rolling mill. As a result, a bar or a band steel 12 is formed. The heating furnace 4 may be a part of continuous casing equipment or an individual equipment for heating the thick plate 6. As an alternative to a structure in which a plurality of the rough rolling machines 10 are disposed in a tandem manner, the rough rolling station 8 may be structured in such a manner that the band steel is reciprocated in at least one rough rolling machine 11 so as to be rolled. Typically, the thick plate 6 is arranged in such a manner that width A1 is about 1.2 m, thickness B1 is about 20 cm and length C1 is about 6 m. The three dimensional size of the thick plate 6 to be processed in the apparatus according to the present invention is not limited, as a matter of course, to the above-described values. The band steel 12 obtainable as a result of the above-described process is typically arranged in such a manner that width A2 is the same as A1, thickness B2 is about 5 cm and length C2 is about 24 m. At least the rear end portion, that is, the rear edge portion 14 of the band steel 12 fed out from the rough rolling station 8 is formed, for example, into a fish tail shape 16 as shown in FIG. 2 (the thickness when viewed in its cross section prior to the rough rolling operation is, as shown in FIG. 2, thin at an intermediate portion 17 in a direction A of the width) or a tongue shape 18 as shown in FIG. 3 (the thickness when viewed in its cross section prior to the rough rolling operation is, as shown in FIG. 3, increased in proportion to the distance from end portions 19 and 20 in the widthwise direction A to the intermediate portion 17) depending upon the shape of the thick plate 6 and the rolling conditions realized by a plurality of the rough rolling mills 10. The length of the fish tail 16 or the tongue 18 is typically made to be about 10 to 50 cm. A leading end portion 22 will also become of a fish tail shape 16, tongue shape or the like, although the degree of such crop formation is less significant than at the rear or trailing end portion 14. For simplicity of description, we assume that the crop is mainly formed at the rear end portion hereinafter, while a smaller crop will be produced actually at the leading end portion. Especially, in a case where the band steel is reciprocated to be rolled in the rough rolling station 8, a curved end portion formed similarly to the shape of the fish tail 16 or the tongue 18 is created in the leading end portion, that is, the front end portion 22 by the same magnitude as in the rear edge or end portion 14 of the band steel 12 due to the rough rolling operation.

In the hot rolling equipment 2 shown in FIG. 1, a crop shear apparatus 26 is disposed at a downstream of the rough rolling station 8 with respect to conveyance direction C in which the band steel 12 is conveyed. The crop shear apparatus 26 shears at least either of the curved end portions or the front and rear end portions 22, 14 of the band steel 12, that is, a crop portion(s) 24 in substantially the widthwise direction A of the band steel 12.

Figure 4:
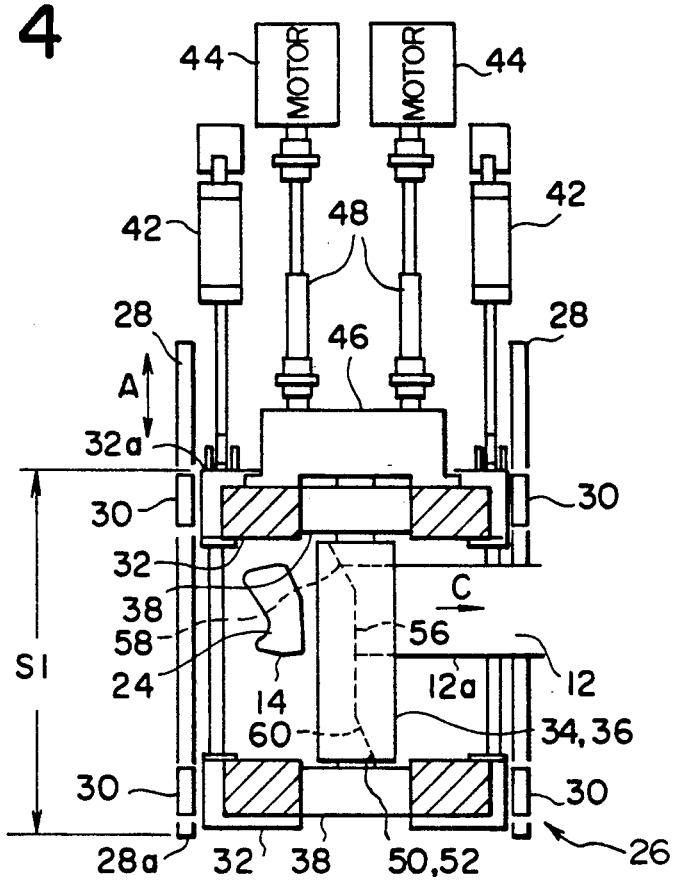
FIG. 4 is a sectional plan view which illustrates an embodiment of the crop shear apparatus according to the present invention.
Figure 5:
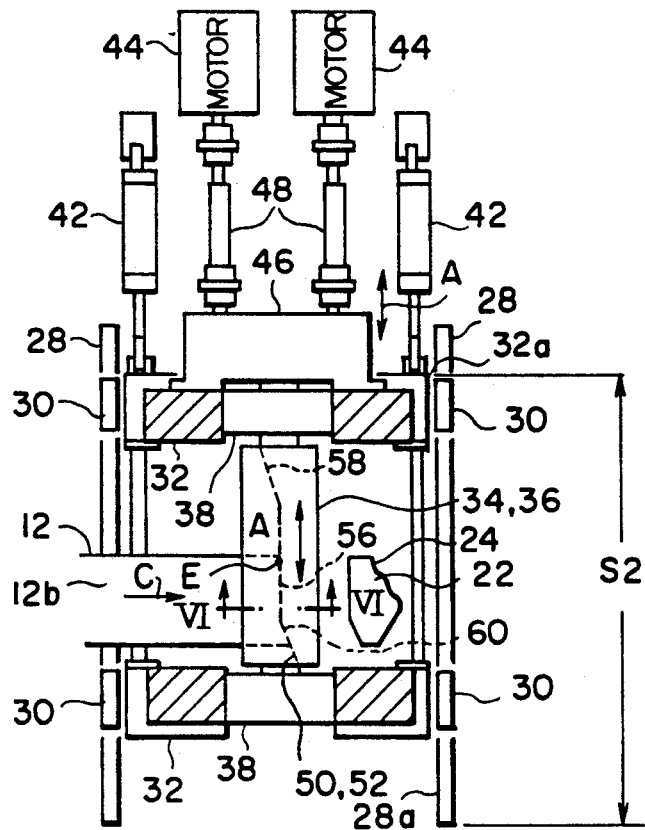
FIG. 5 is a sectional plan view which illustrates the crop shear apparatus sown in FIG. 4 but in a different status of operation.
Figure 6:
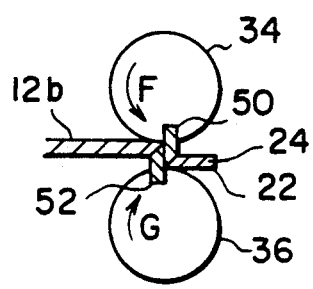
FIG. 6 is a sectional view taken along line VI—VI of FIG. 5.
Figure 7:
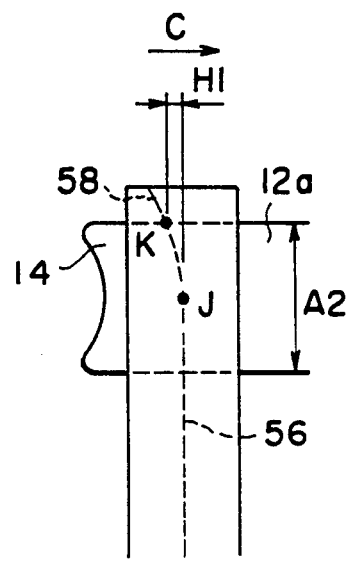
FIG. 7 is an enlarged view which illustrates a state in which a crop at the rear end portion of leading band steel is sheared.

As shown in FIGS. 4 to 6, the crop shear apparatus 26 comprises, for example, a drum-type shear machine for shearing a plate 12 while being moved, including a pair of guide rails 28, 28 positioned stationarily on the ground and extending in the direction A, the operating side and drive side housings 32, 32 capable of integrally moving in the direction A via wheels 30 positioned on the guide rails 28, a pair of bearings 38 mounted to the housings 32 and rotatably supporting a pair of vertically disposed rotational drums 34 and 36, and a hydraulic cylinder devices 42, 42 an end portion of each of which is mounted to a base 40 stationarily placed on the ground and another end of each of which is mounted to the housing 32, the hydraulic cylinder devices 42 acting to move the housing 32 in the direction A along the rails 28. Reference numeral 44 represents a drive motor, and 46 represents a reduction gear or decelerator mounted to the drive side housing 32 for transmitting rotation transmitted from the output shaft of the motor 44 via a spindle 48 to the drums 34 and 36. The drums 34 and 36 have corresponding single shear blades 50 and 52 respectively. As a result, a set of a drum-type shear 54 is constituted. Since the vertically-disposed shear blades 50 and 52 are formed in a mirror-symmetrical manner, the description will be made mainly about one of the shear blades 50, 52, i.e. the shear blade 50. The shear blade 50 extends on the circumferential surface of the drum 34 in substantially axial direction A of the drum 34, that is, in substantially the widthwise direction A of the band steel 12 to be sheared. More specifically, the shear blade 50 comprises a central straight portion 56 extending in the axial direction A and two end blade portions 58 and 60 diagonally or obliquely extending with respect to the above-described straight blade portion 56, the two end blade portions 58 and 60 serving as diagonal or oblique blade portions. Therefore, the shear blade 50 comprises portions having different curvatures when viewed in a state shown in FIG. 4 (or partially enlarged FIG. 7). The two end blade portions 58 and 60 are formed into blade shapes which are point-symmetrical with each other around center E of the straight blade portion 56. However, they may be formed into unsymmetrical shapes but the two side portions of the center E are formed into not-mirror-symmetrical shapes. Although the two end blade portions 58 and 60 are formed into straight shapes in FIGS. 5 and 6, it is preferred that the shapes be formed into curved shaped smoothly connected to the central straight blade portion 56 as shown in FIG. 7. Furthermore, the straight blade portion 56 may be formed into a curved shape having a much larger radius of curvature, instead of the straight shape, (than the radius of curvature of a conventional blade, that is, 10 to 20 m), for example, a circular arc shape.

The central straight blade portion 56 and the end blade portion 58, one of the two end blade portions 58 and 60, are used to shear the crop 24 at the rear end portion 14 of the leading or downstream band steel 12a sequentially fed out from the rough rolling station 8 after it has been rolled. The central straight blade portion 56 and the other end blade portion 60 are used to shear the crop 24 in the front end portion 22 of the upstream side band steel 12b sequentially fed out from the rough rolling station 8 after it has been rolled.

That is, in a case where the rear end portion of the leading or downstream side band steel 12a, that is, the crop 24 in the rear end portion 14 thereof is sheared, the cylinder device 42 is extended to position the housings 32 at a lower position (a position at which the distance from a rail end portion 28a to a housing end portion 32a is S1) shown in FIG. 4 during the conveyance of the band steel 12a between the drums 34 and 36 in the direction C. Furthermore, the crop 24 in the rear end portion 14 of the band steel 12a is sheared by the blade portions 56 and 58 of the shear blades 50 and 52 of the drums 34 and 36 which are rotated in directions F and G in synchronization with the conveyance of the band steel 12a in the direction C when the rear end portion 14 of the band steel 12a passes through a portion between the drums 34 and 36. At this time, the band steel 12a is cut or sheared such that projection quantity H is equal to a predetermined length H1. The term "projection quantity H" means the degree or magnitude of deviation, in the direction C, of a widthwise end portion K with respect to a central portion J in the widthwise direction A of a sheared end portion 14a of the band steel 12a (see FIG. 7). The projection quantity H is determined to a predetermined quantity to be described later in accordance with a cross-sectional shape L of the roughly-rolled band steel 12a (see FIGS. 9 and 8). In this case, the shape of each of the shear blade portions 56 and 58 may be determined properly to suit the characteristics or the like of the rough rolling mill 8. In a case where the shear blade portions 56 and 60 each of which is formed into a predetermined shape are used, the distance of the movement of the housing 32 in the direction A may be adjusted in accordance with the projection quantity H.

On the other hand, in a case where the crop 24 in the front end portion 22 of the upstream side band steel 12b serving as the trailing or follower band steel is sheared, the cylinder device 42 is contracted before the band steel 12b is introduced into a portion between the drums 34 and 36 in the direction C. AS a result, the housings 32 are positioned at an upper position (a position at which the distance from the rail end portion 28a to the housing end portion 32a is S2) as shown in FIG. 5. Therefore, the crop 24 in the front end portion 22 of the band steel 12b is sheared by the blade portions 56 and 60 of the shear blades 50 and 52 of the drums 34 and 36, which are being rotated in the directions F and G in synchronization with the C-directional conveyance of the band steel 12, more specifically 12b, when the rear end portion 22 of the band steel 12b passes through a portion between the drums 34 and 36. Also in this case, the band steel 12b is cut or sheared such that the projection quantity H is equal to a predetermined length H1. The term "projection quantity H" means the degree of deviation, in the direction C, of a widthwise another end portion N with respect to a central portion M in the widthwise direction A of a sheared end portion 22a of the band steel 12b (see FIG. 7). The projection quantity H is determined to a predetermined quantity in accordance with a cross-sectional shape L of the leading band steel 12a, which has been roughly rolled, and the projection H1 of the sheared rear end portion 14a of the leading band steel 12a (see FIGS. 9 and 8). In this case, we have neglected a formation of a crop at the leading end portion 22a of the band plate 12b upon finish-rolling. However, strictly speaking, such crop formation at the leading end portion 22a will be further taken into consideration, and the projection quantity H of both band steels 12a, 12b may be less than the quantity H1. In any event, it is essential that the projection quantity H of both band plates 12a, 12b at their respective connected ends should be substantially the same. The shape of each of the shear blade portions 56 and 60 may be properly determined in accordance with the characteristics of the rough rolling mill 8 or the like. In a case where the shear blade portions 56 and 60 each of which is formed into a predetermined shape are used, the distance of the movement of the housings 32 in the direction A may be adjusted in accordance with the projection quantity H.

Figure 10:
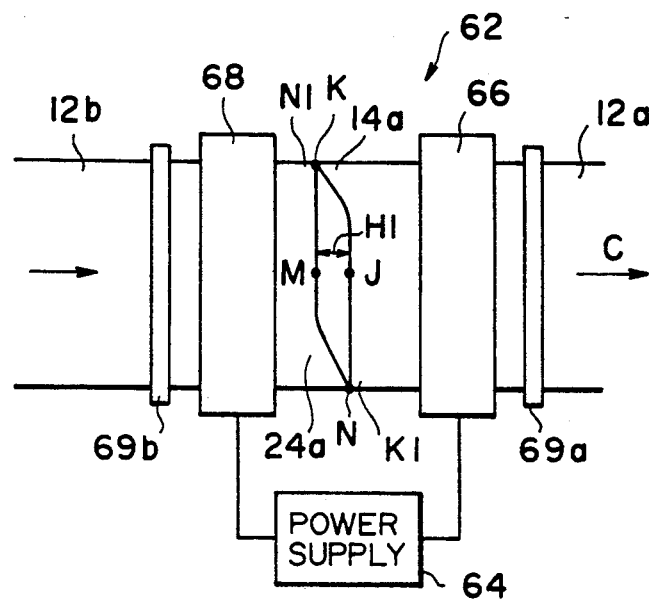
FIG. 10 is a plan view which illustrates a sheared rear end portion of the leading band steel and a sheared front end portion of the follower band steel shown in FIG. 8 to be connected to each other by a connecting device.
Figure 11:
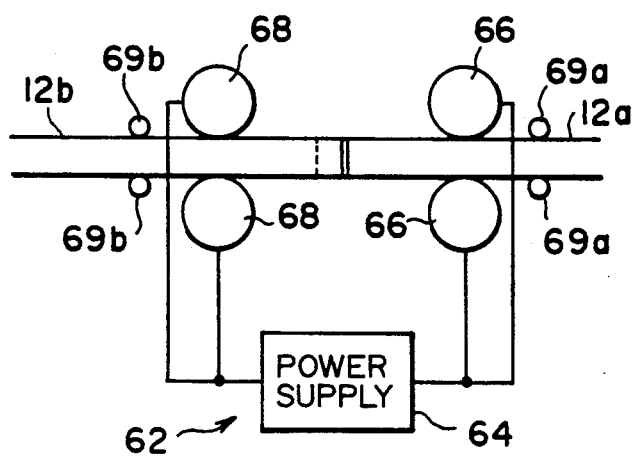
FIG. 11 is a front elevational view which illustrates the connecting device shown in FIG. 10.

The band steel 12, the end portion of which in the lengthwise direction C has been sheared during the conveyance in the direction C (conveyance speed may be changed or reduced substantially down to zero if desired), is subjected to a process in which the sheared rear end portion 14a (of the downstream side band steel 12a) and the sheared front end portion 22a (of the upstream side band steel 12b) which are positioned adjacent to each other are connected to each other by a connecting device 62. As shown in FIGS. 10 and 11, the connecting device 62 comprises, for example, a power supply or source 64 and two pairs of roller electrodes 66 and 68. In the connecting device 62, the sheared rear end portion 14a of the band steel 12a and the sheared front end portion 22a of the band steel 12b positioned adjacent to each other are brought into contact with each other Reference numerals 69a and 69b represent pinch rollers serving as pushing devices for abutting the adjacent end portions 14a, 22a of the two steel portions 12a and 12b. However, the either one of the pinch roller 69a or 69b or both of the same may be omitted from the structure. In this state, the projection end portion K of the sheared end portion 14a is brought into contact with a side end portion N1 of the sheared end portion 22a, while the projection end portion N of the sheared end portion 22a is brought into contact with a side end portion K1 of the sheared end portion 14a. On the other hand, the two band steel portions 12a and 12b are not brought into contact with their widthwise intermediate portions but are maintained at positions away from each other by distance H1 corresponding to the magnitude or degree of the projection quantity H. The distance H1 is determined large enough such that no electric discharge takes place between the spaced intermediate portions. Therefore, an electric current supplied to a portion between the roller electrodes 66 and 68 from the power supply 64 passes through two narrow contact portions between N1 and K and between N and K1 of the sheared end portions 14a and 22a. At this time, the contact portion between N1 and K and the portion between N and K1 are respectively welded together due to heat generated in the two electrically resistive contact portions between N1 and K and between N and K1 each displaying large electric resistance due to the contact taken place in the above-described contact portions. As a result, a band steel 69 is formed by integrating the band steel 12a with the band steel 12b. In the above-described connecting device 62, the which is likely to be lowered, can be welded together within a short time while maintaining to convey the two band steel portions 12a and 12b (or only by stopping them for a short time). Therefore, the undesirable temperature reduction can be minimized.

Figure 8:
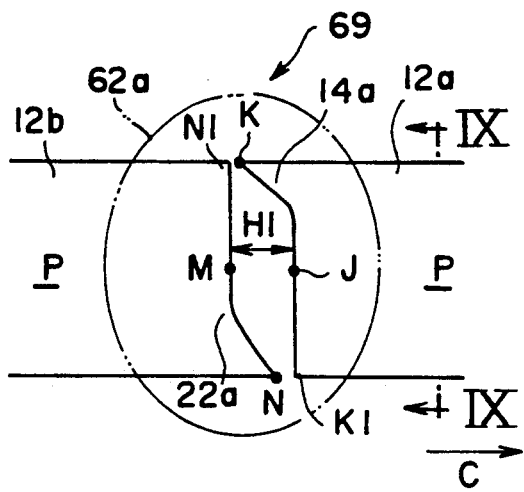
FIG. 8 is a plan view which illustrates a state in which leading band steel having the cross-sectional shape shown in FIG. 9 and follower band steel of the same sectional shape connected to each other by a connecting device.
Figure 9:
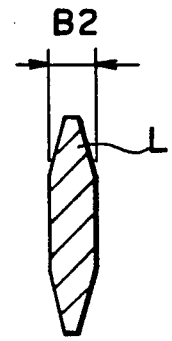
FIG. 9 is a cross-sectional view taken along line IX—IX and illustrating the leading band steel before being finish-rolled.

Instead of the connecting device 62 shown in FIGS. 10 and 11, another structure may be employed in which a solenoid coil designated by a phantom line 62a of FIG. 8 is used to apply a varying vertical magnetic field to principal surfaces P of the band steel 12a and 12b and pass an induced current through the contact portions between N1 and K and between N and K1.

The crop shear equipment 70 comprises the crop shear apparatus 26 and the connecting device 62 (or 62a).

The integrated band steel 69 is, then, finish-rolled by a finish rolling mill 72 as a second roll mill so that final band steel 74 the width of which is A2 and the thickness of which is B3 is actually continuously formed, the band steel 74 thus formed being then taken up by a take-up or winding machine 76.

Figure 12:
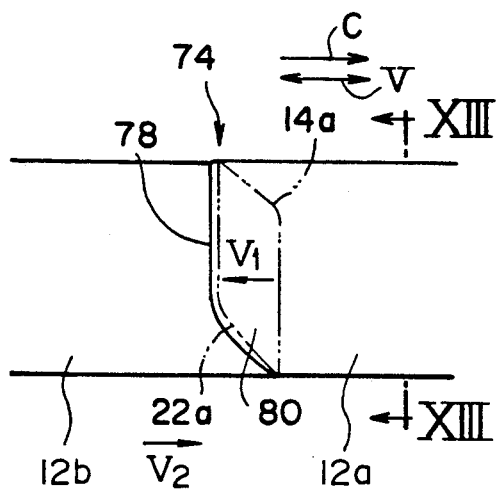
FIG. 12 is a plan view which illustrates a state of connection established between the leading and follower band steel plates after they have been finish-rolled.
Figure 13:
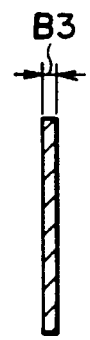
FIG. 13 is a cross-sectional view taken along line XIII—XIII shown in FIG. 12.

At the time of the finish-rolling process in the finish rolling mill 74, the integrated band steel 69 is subjected to a thickness reduction process in which the thickness B2 is reduced to B3 (in a typical example, it is reduced from 5 cm to 2 mm) (see FIG. 13). Furthermore, it is extended in a rolling direction V in which a tongue 78 (designated by a continuous line in FIG. 12) is formed in the rear end portion 14a (designated by a phantom line in FIG. 12) of the original band steel portion 12a in a case of the cross section L shown in FIG. 9, that is, in a reverse direction V1 opposing the conveyance direction C in accordance with the cross-sectional shape L of the integrated band steel 69. The original gap size H1 is set so that the tongue portion 78 extends in a sense of the direction V1 over the front end portion 22a of the original band steel 12b designated by the phantom line of FIG. 12. Therefore, the original band steel portions 12a and 12b are actually connected to each other in the overall portion in the widthwise direction A in a state of the final finish-rolled band steel 74. In the explanation above, we have neglected the longitudinal expansion or extension of the front end portion 22a of the band steel 12b in a sense of direction V2. If we recall such expansion, the overlapping of the end portions will be much larger.

Figure 14:
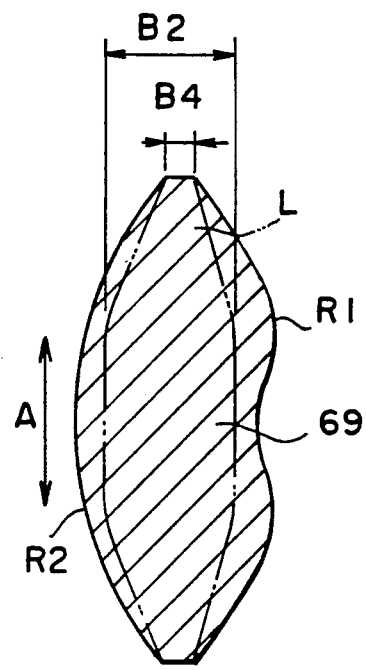
FIG. 14 illustrates a variety of cross-sectional surfaces of the band steel before being finish-rolled.

The degree of the extension adjacent to the rear end portion 14a substantially depends upon the change in the thickness in the widthwise direction A. Therefore, the gap H1 can be plugged or filled by a structure the thickness of each of the two side end portions of which is the same as the band steel 69 having the cross section L (designated by a phantom line shown in FIG. 14 and the thickness of each of the two side end portions of which is B4 and the thickness at the central portion of which is B2) and that of the central portion of which is thicker than that of the band steel 69. As a result, a structure having a shape designated by R1 at a right-hand-side portion of the cross section (which creates a fish tail by the rolling operation) or a structure having a shape designated by R2 at a left-hand-side portion of the cross section (which creates a larger tongue by the rolling operation) can fill the gap. A connected or filled portion 80 of the band steel 74 which has been produced by finish-rolling will be ordinarily cut off before the band steel 74 is actually used. Therefore, there may be no necessity of perfectly filling or plugging the connected portion 80 while leaving a partial gap if there is no problem in handling the band steel 74 after the finish rolling operation has been completed.

As described above, the crop shear equipment 70 acts in cooperation with the finish rolling mill 72 to enable the endless finish rolling operation to be performed.

Figure 15:
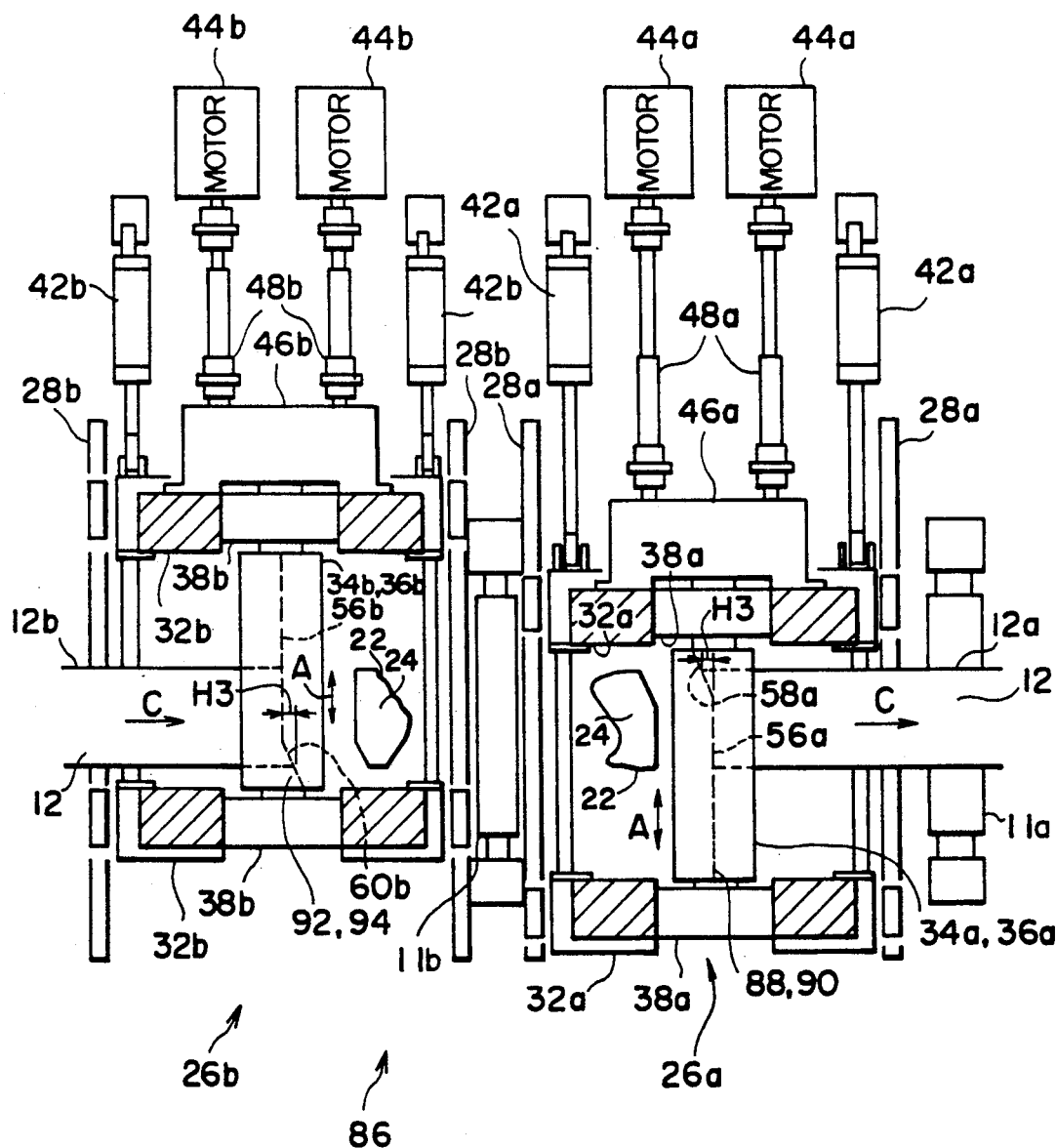
FIG. 15 is a sectional plan view which illustrates another embodiment of the crop shear apparatus according to the present invention.

Instead of the arrangement in which the rear end portion 14 and the front end portion 22 of the band steel 12 are sheared by a pair of the shear blades 50 and 52 of one drum-type shear apparatus 26, a tandem type shear apparatus 86 shown in FIG. 15 and having two shears 26a and 26b disposed in series and each of which is arranged similarly to the apparatus 26 may be used. The tandem type shear apparatus 86 acts such that the sharing device 26a shears the rear end portion 14 of the band steel 12 while the other shear 26b shears the front end portion 22 of the band steel 12. Each of the shear devices 26a and 26b of the tandem-type shear apparatus 86 has a similar structure as that of the shear apparatus 26 except for the difference in the shear blade. Therefore, suffix "a" or "b" is given to each of the same reference numerals for each of the members or elements of the shears 26a or 26b shown in FIG. 15 which correspond to each of those of the shear apparatus 26. Each of shear blades 88 and 90 of the shear device 26a comprises a shear blade portion 56a arranged similarly to the straight shear blade 56 and a side edge shear blade portion 58a arranged similarly to the shear blade portion 58 of the shear blades 50 and 52. On the other hand, each of shear blades 92 and 94 of the shear device 26b comprises a shear blade 56b arranged similarly to the straight shear blade portion 56 and a side edge shear blade portion 60b arranged similarly to the shear blade portion 60 of the shear blades 50 and 52. In the shear apparatus 86, the degree of the expansion/contraction of a hydraulic cylinder device 42a is adjusted so that the A-directional position of each of drums 34a and 36a of the shear device 26a is adjusted such that the rear end portion 14 of the band steel 12 is sheared to realize a predetermined projection quantity H3. Furthermore, the degree of the expansion/contraction of a hydraulic cylinder device 42b, which is individually or independently controlled from or of the hydraulic cylinder 42a, is adjusted so that the A-directional position of each of drums 34b and 36b of the shear 26b is adjusted such that the front end portion 22 of the band steel 12 is sheared to realize the predetermined projection quantity H3. The degree of the projection quantity H3, that is, the A-directional position of each of the drums 34a, 36a, 34b and 36b can be adjusted in accordance with the band steel 12 to be sheared. The shear apparatus 86 can simultaneously shear the rear end portion 14a and the front end portion 22a of the leading and trailing band steels 12a and 12b by the individual or independently operated shear devices 26a and 26b. Therefore, the waiting time required for the further leading band steel in the next connecting process can be shortened so that the undesirable reduction in temperature of the band steel can be further minimized. Therefore, the apparatus 86 can be preferably employed in the endless rolling operation. Reference characters 11a, 11b denote table rollers for feeding the band steel 12.

Figure 16:
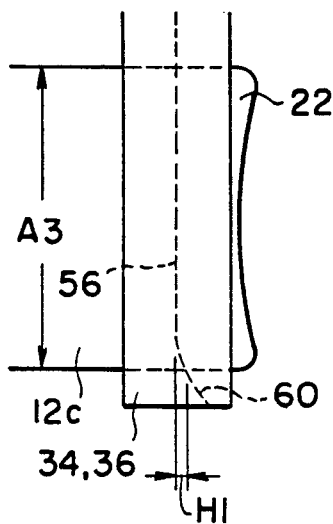
FIG. 16 is an enlarged plan view which illustrates an example in which the front end crop of follower band steel having a width larger than that of the leading band steel is sheared by the apparatus shown in FIG. 15.
Figure 17:
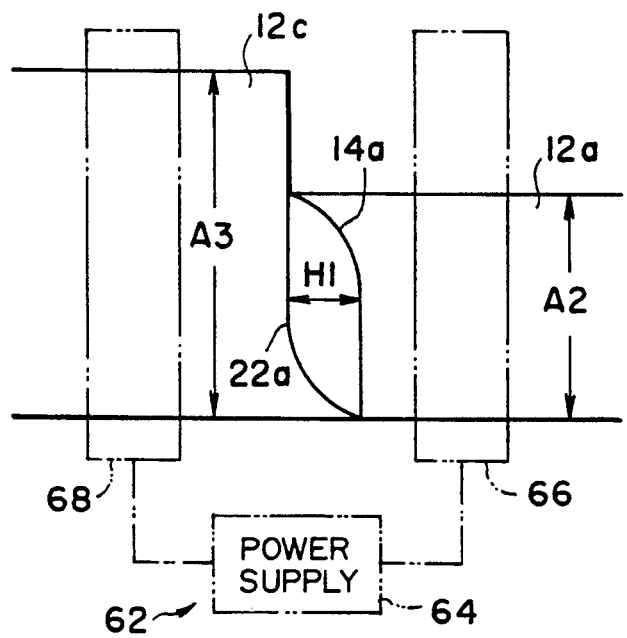
FIG. 17 is a plan view which illustrates an example in which the sheared rear end portion of the leading band steel sheared by the apparatus shown in FIG. 15 and the sheared front end portion of the follower band steel are connected to each other by the connecting device.
Figure 18:
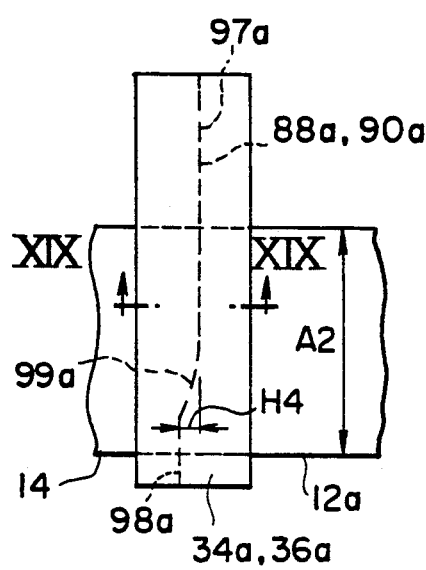
FIG. 18 is a plan view which illustrates a state in which a crop shear apparatus having a shear blade of a different shape and according to another embodiment of the present invention is shearing the rear end crop of the leading band steel.
Figure 19:
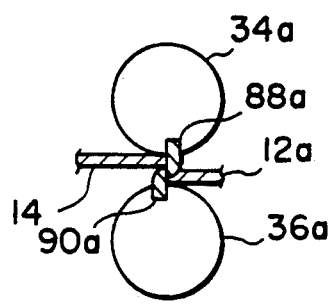
FIG. 19 is a sectional view of the apparatus shown in FIG. 18 and taken along line XIX—XIX.
Figure 20:
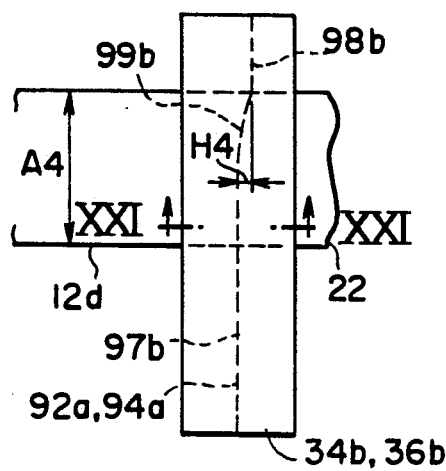
FIG. 20 is a plan view which illustrates a state in which the front end crop of follower band steel having a narrower width than that of the leading band steel is sheared by the apparatus shown in FIG. 18.
Figure 21:
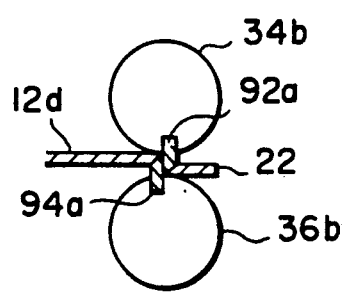
FIG. 21 is a sectional view of the apparatus shown in FIG. 20 and taken along line XXI—XXI.

Even if the width of the band steel 12 is different, end portions can be sheared to have the same projection quantity H (for example, H1) by the shear apparatus 26 or 86. For example, in a case where band steel 12c the width of which is A3 is connected to the sheared end portion 14a of the band steel 12a, the width of which is A2 and the projection quantity of which is H1, the A-directional positions of the drums 34 and 36 of the shear apparatus 26 are adjusted in such a manner that the projection quantity of the band steel 12c the width of which is A3 is H1 in the front end portion 22a as shown in FIG. 16. Then, the front end portion 22 of the band steel 12c may be sheared in the widthwise direction. Then, the two band steel portions 12a and 12c may be connected to each other as shown in FIG. 17 by the connecting device 62.

Figure 22:
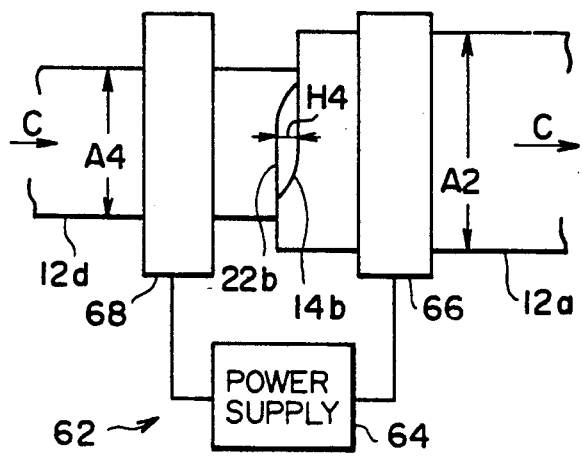
FIG. 22 is a plan view which illustrates an example in which the sheared rear end portion of the leading band steel sheared by the apparatus shown in FIG. 18 and the sheared front end portion of the follower band steel are connected to each other by a connecting device.

In a case where the band steel 12a and 12b having different widths (the widths of which are respectively A2 and A4) are connected to each other at their widthwise central portions, the tandem-type shear apparatus shown in FIG. 15 having two pairs of shear blades 88a and 90a and shear blades 92a and 94a mounted to drums 34a and 36a and drums 34b and 36b may be used to shear the rear end portion 14 of the band steel 12a and the front end portion 22 of the band steel 12d as shown in FIGS. 18 to 21. In this case, the shear blade 88a (also 90a) has straight shear blade portions 97a and 98a extending in the axial direction and formed on the two side portions thereof and a shear blade portion 99a extending diagonally or obliquely to the shear blade portion 97a and 98a, formed at an intermediate portion of the same and serving as the diagonal or oblique blade portion. The shear blade 92a (also 94a) has shear blade portions 97b and 98b extending in the axial direction and formed on the two side portions thereof and a shear blade portion 99b extending diagonally or obliquely to the shear blade portion 97b and 98b, formed at an intermediate portion of the same and serving as the diagonal or oblique blade portion. The shear blade portions 97a, 98a and 99a are formed into point-symmetrical shapes with respect to the shear blade portions 97b, 98b and 99b. In this case, the band steel 12a is sheared by all of the three shear blade portions 97a, 98a and 99a, while the band steel 12d is sheared by all of the three shear blade portions 97b, 98b and 99b. Furthermore, as shown in FIG. 22, the sheared end portions 14b and 22b are brought into contact with each other at the two straight side end portions to be connected thereat in such a manner that the central positions in the widthwise direction A of the band steel 12a and 12d are faced or aligned As a result, the band steel 12a and 12d can be made integral. In this case, it is preferred that the A-directional positions of the shear blades 88a, 90a, 92a and 94a at the time of shearing the band steel 12a and 12d be adjusted to have relatively short straight side portions to be contracted in order to effectively performing welding in the connecting device 62 by heat generated at the contacts.

Figure 23:
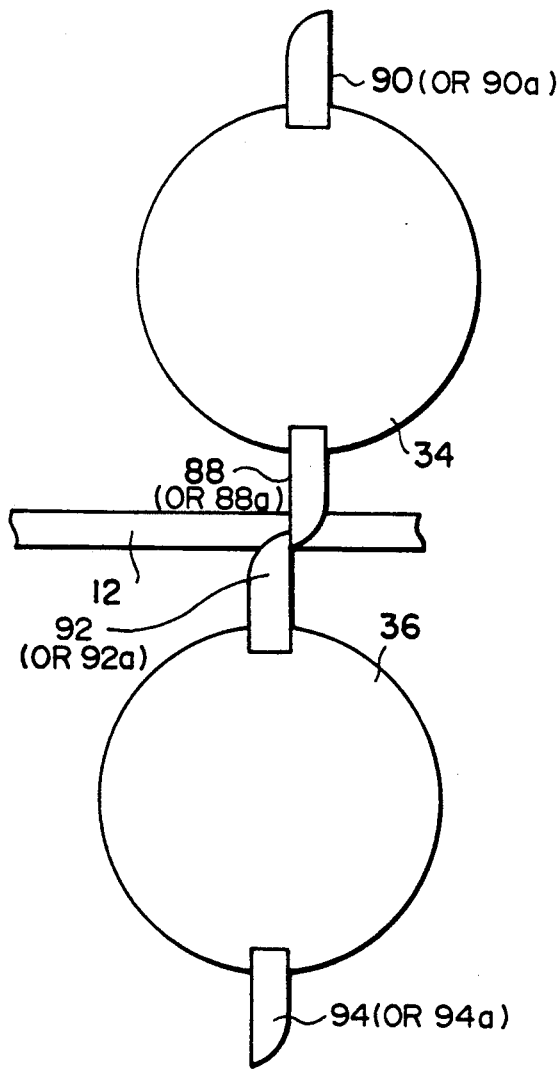
FIG. 23 is a front elevational view which illustrates another embodiment of a crop shear apparatus according to the present invention and comprising a drum-type shear constituted by two shear blades for each drum.

Although one shear blade is provided for each drum according to the structure shown in FIG. 15, two shear blades may be provided for each drum as shown in FIG. 23. For example, in a case where the shear blades 88 and 90 (or 88a and 90a) are provided at two positions in the direction of the diameter of the drum 34 and shear blades 92 and 94 (or 92a and 94a) are provided at two positions in the direction of the diameter of the drum 36, the shear apparatus 26 having one drum-type shear device (with two shear blades thereon) can provide the same effect as the apparatus 86 having the two shear devices 26a and 26b.

Figure 24:
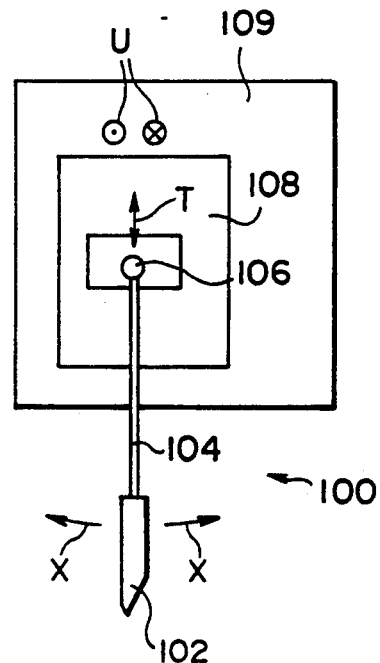
FIG. 24 is a front elevational view which illustrates another embodiment of a crop shear apparatus according to the present invention and comprising a pendulum type shear.

Although the shear apparatus comprises the drum-type shear according to the above-described embodiments, at least a portion of the shear apparatus may be made of a pendulum-type shear 100 as shown in FIG. 24 as instead of the drum-type shear. In the pendulum-type shear 100, a fulcrum 106 of a pendulum 104 having a lower end portion to which a shear blade 102 is fastened is moved in vertical direction T with respect to a carrier 108 in synchronization with the X-directional pendulum motion of the shear blade 102. The shear blade 102 shears at least one end portion of the band steel 12 by a motion realized by synthesizing the S and T directional motions. The carrier 108 is movable in direction U which is perpendicular to the surface of the drawing sheet with respect to the frame 109. Furthermore, the shape of the shear blade 102 in the direction perpendicular to the drawing sheet may be arranged to be any one of the above-described shapes as referred to the shear blades for the drum-type shear.

Figure 25:
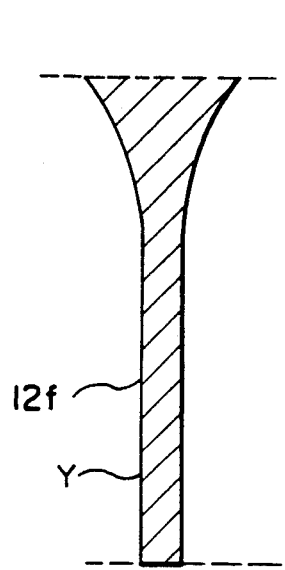
FIG. 25 is a cross-sectional view which illustrates the cross-sectional shape of band steel before being finish-rolled.
Figure 26:
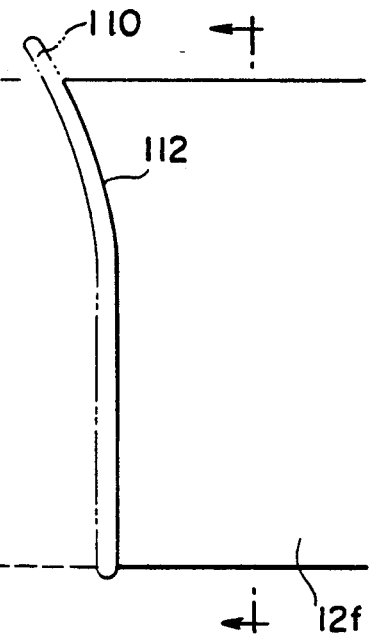
FIG. 26 is a plan view which illustrates the shape of the sheared end portion of the band steel shown in FIG. 25.
Figure 27:
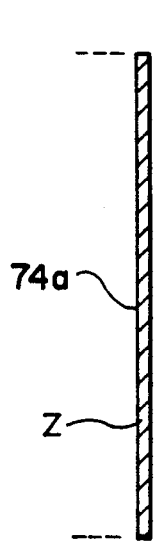
FIG. 27 is a cross sectional view which illustrates the cross sectional shape of the band steel before being finish-rolled.
Figure 28:
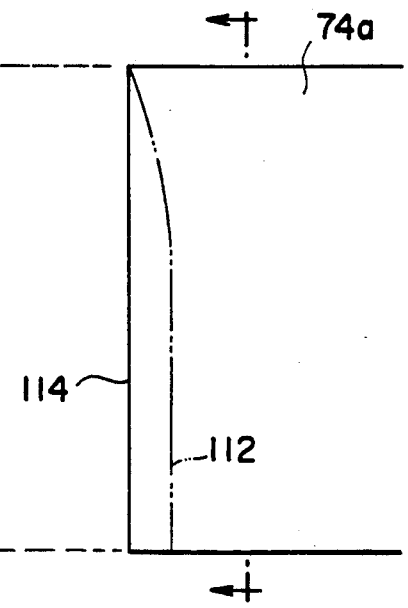
FIG. 28 is a plan view which illustrates the shape of the end portion of the band steel shown in FIG. 27 after it has been finish-rolled.

Although the description has been made about the case in which the band steel members are connected to each other, the rear end portion 22 of the band steel 12 may be sheared before the finish-rolling, so that the rear end portion 22 of the band steel 12 become, after the finish-rolling substantially straight in the widthwise direction A. For example, in a case where of band steel 12f having a horizontal cross-sectional shape Y (see FIG. 25) before a finish-rolling operation, in which lower part (in FIG. 26) of the band steel 12f is predicted to be expanded upon the finish rolling operation, the rear end portion is sheared, in advance, to be formed into a shape designated by reference numeral 112 by a shear blade 110 having a shape capable of compensating a predicted shape. In this case, assuming that final band steel 74a having a cross-sectional surface shown in FIG. 27 is obtained by finish-rolling, a rear end portion 114 of the band steel 74a is formed into a straight shape as shown in FIG. 28. The shape 112 depends both on the cross-sectional shapes Y, Z before and after the finish-rolling.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A crop shear apparatus disposed in a conveyance passage in which band steel is conveyed from a first rolling mill to a second rolling mill of hot rolling equipment, said crop shear apparatus comprising:

at least one shear blade for shearing said band steel in a widthwise direction of said band steel conveyed from said first rolling mill to said second rolling mill; and a supporting mechanism for movably supporting said at least one shear blade in said widthwise direction of said band steel, wherein said at least one shear blade is present in a non-mirror-symmetrical shape along the widthwise direction of said band steel on a center in the widthwise direction of said band steel such that a plane shape along the widthwise direction of said band steel at a sheared end portion can be adjusted when said band steel is sheared in a state where said blade has been moved in said widthwise direction of said band steel.

2. A crop shear apparatus according to claim 1, wherein said at least one non-mirror symmetrical shape shear blade has at least one straight blade portion extending in a direction perpendicular to a lengthwise direction of said band steel and at least one oblique blade portion obliquely extending from said straight blade portion.

3. A crop shear apparatus according to claim 2, wherein said at least one non-mirror-symmetrical shape shear blades has said straight blade portion at an intermediate portion in the widthwise direction and said oblique blade portions on the two end portions in the widthwise direction.

4. A crop shear apparatus according to claim 2, wherein said at least one non-linear shape shear blade has said oblique blade portion at an intermediate portion in the widthwise direction and said straight blade portions on the two end portions in the widthwise direction.

5. Crop shear equipment comprising a crop shear apparatus according to claim 1 and a connecting device, disposed between said crop shear apparatus and said second rolling mill, for connecting a rear end portion of a leading band steel and a front end portion of a follower band steel positioned in the upstream side of said leading band steel.

6. Crop shear equipment according to claim 5, wherein said at least one non-mirror-symmetrical shape blade has an intermediate straight blade portion and non-linear blade portions disposed on the two sides of said intermediate straight blade portion and having different shapes, said intermediate straight blade portion and one of said non-linear blade portions shear a rear end crop of said leading band steel, said intermediate straight blade portion and another of said non-linear blade portions shear a front end crop of said follower band steel, and said at least one non-linear shear blade is adapted to shear said rear end portion of said leading band steel and said front end portion of said follower band steel such that said sheared front end portion and said sheared rear end portion are connected to each other over substantially all the widthwise direction after a portion in which said leading and steel and said follower band steel are connected have been rolled by said second rolling mill.

7. Crop shear equipment according to claim 5, wherein said shear apparatus has at least two shear blades;

said supporting device is adapted to movably support said at least two shear blades in said widthwise direction of said band steel, one of said two shear blades shears said rear end crop of said leading band steel and another of said two shear blades shears said front end crop of said follower band steel, and said at least two shear blades are adapted to shear said rear end portion of said leading band steel and said front end portion of said follower band steel such that said sheared front end portion and said sheared rear end portion are connected to each other over substantially all the widthwise direction after a portion in which said leading band steel and said follower band steel are connected have been rolled by said second rolling mill.

8. Crop shear equipment according to claim 7, wherein said supporting mechanism is adapted such that it integrally moves said two shear blades in said widthwise direction.

9. Crop shear equipment according to claim 7, wherein said supporting mechanism is adapted such that it individually moves said two shear blades in said widthwise direction.

10. Crop shear equipment according to claim 5, wherein said shear blade shears said rear end portion of said leading band steel and said front end portion of said follower band steel in such a manner that at least one of said rear end portion of said leading band steel and said front end portion of said follower band steel are connected in its widthwise direction upon said connection.

11. Crop shear equipment according to claim 10, wherein said connecting device is adapted to connect said rear end portion of said leading band steel with said front end portion of said follower band steel by heat generated due to electrical resistance.

12. A crop shear apparatus according to claim 1, wherein said at least one shear blade has a shape with which a rear end portion of said band steel extends in substantially linearly in a direction substantially perpendicular to a conveyance direction after said band steel has been rolled by said second rolling mill.

13. A crop shear apparatus according to claim 1, wherein the first rolling mill comprises a rough rolling mill and the second rolling mill comprises a finish rolling mill.

* * * * *